Oct. 7, 1958     V. E. ACKLES     2,854,945
MACHINE FOR GLAZING DOUGHNUTS AND THE LIKE
Filed April 3, 1956     3 Sheets-Sheet 1
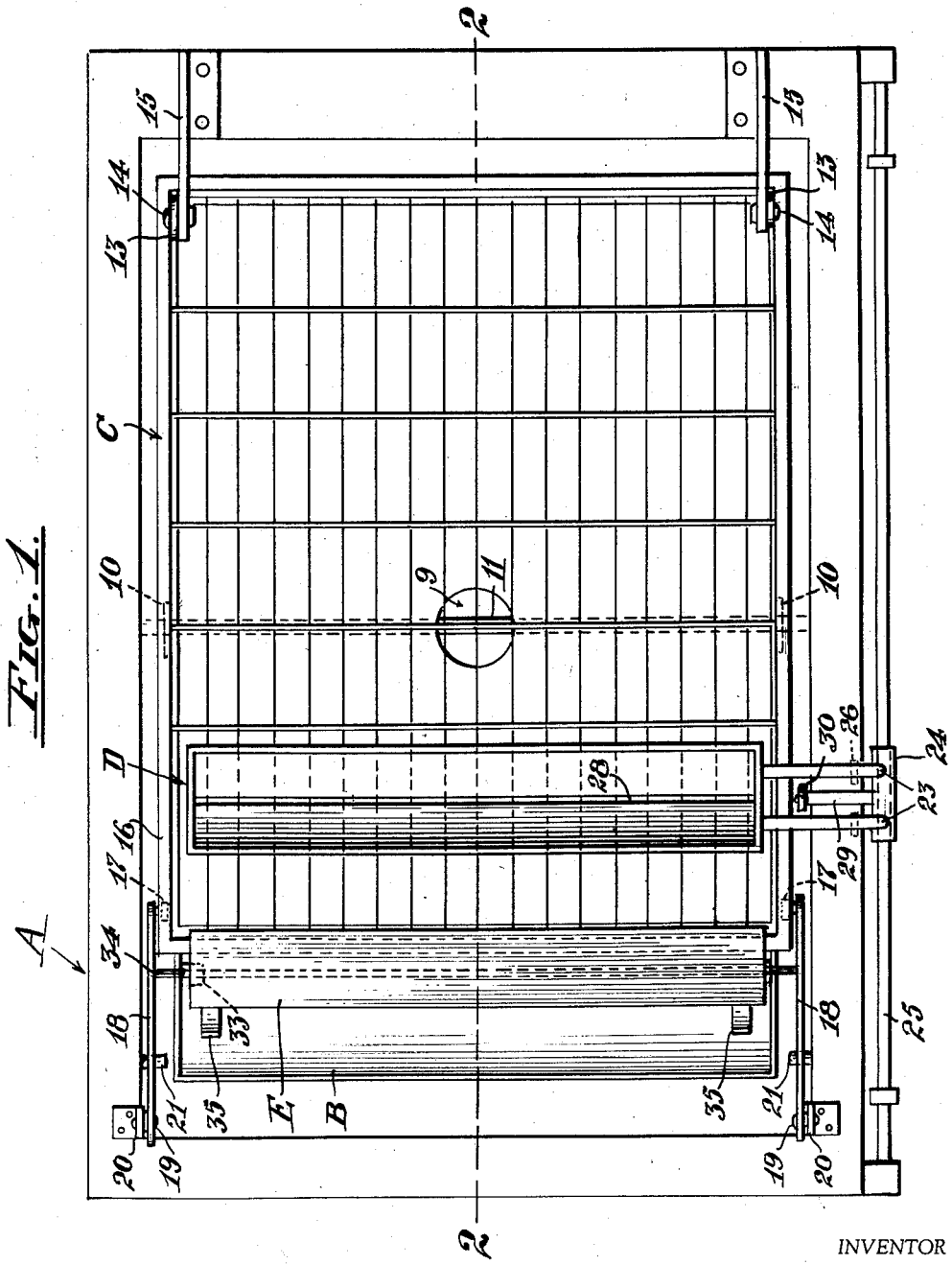
INVENTOR
*Virgil E. Ackles;*
BY
ATTORNEY

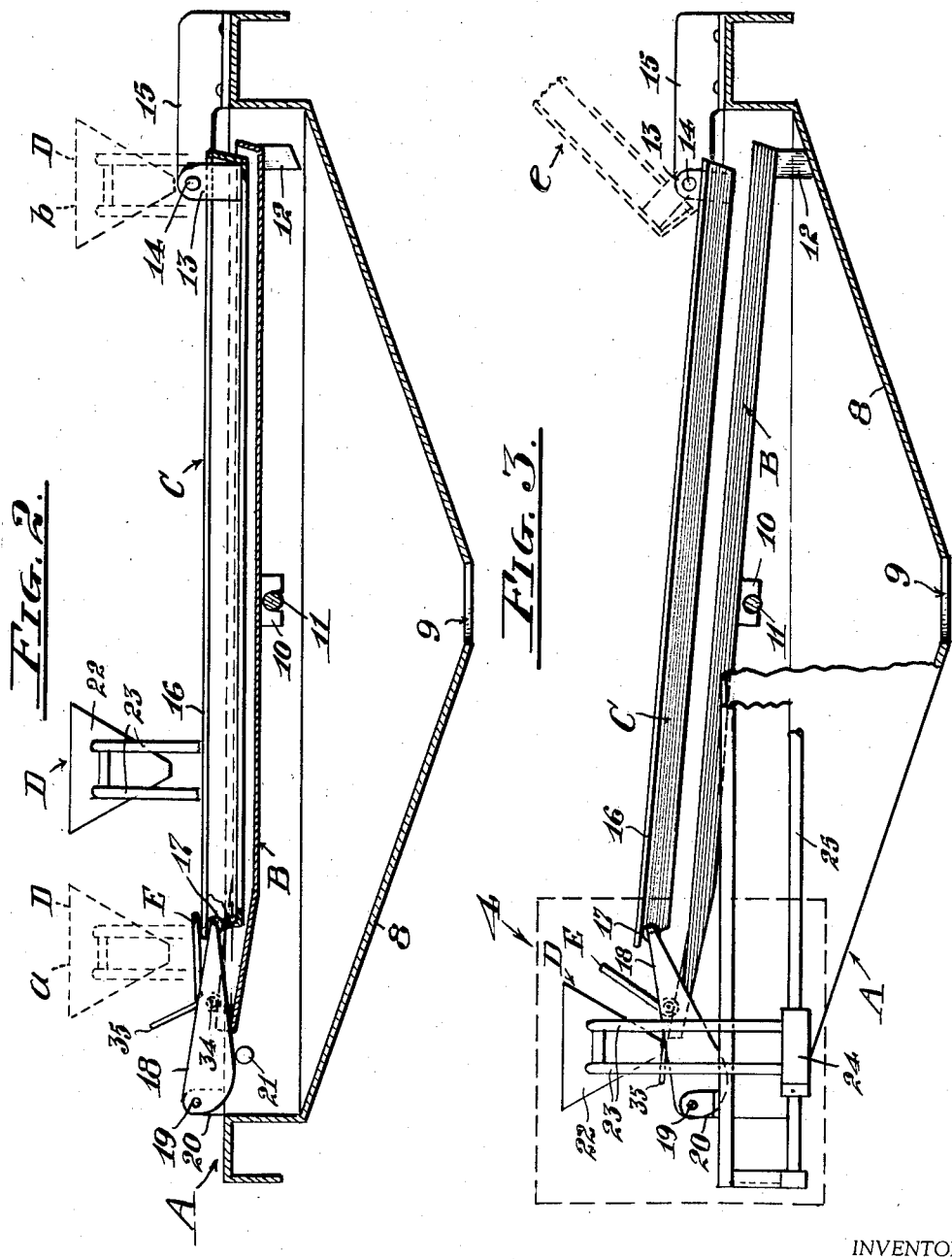

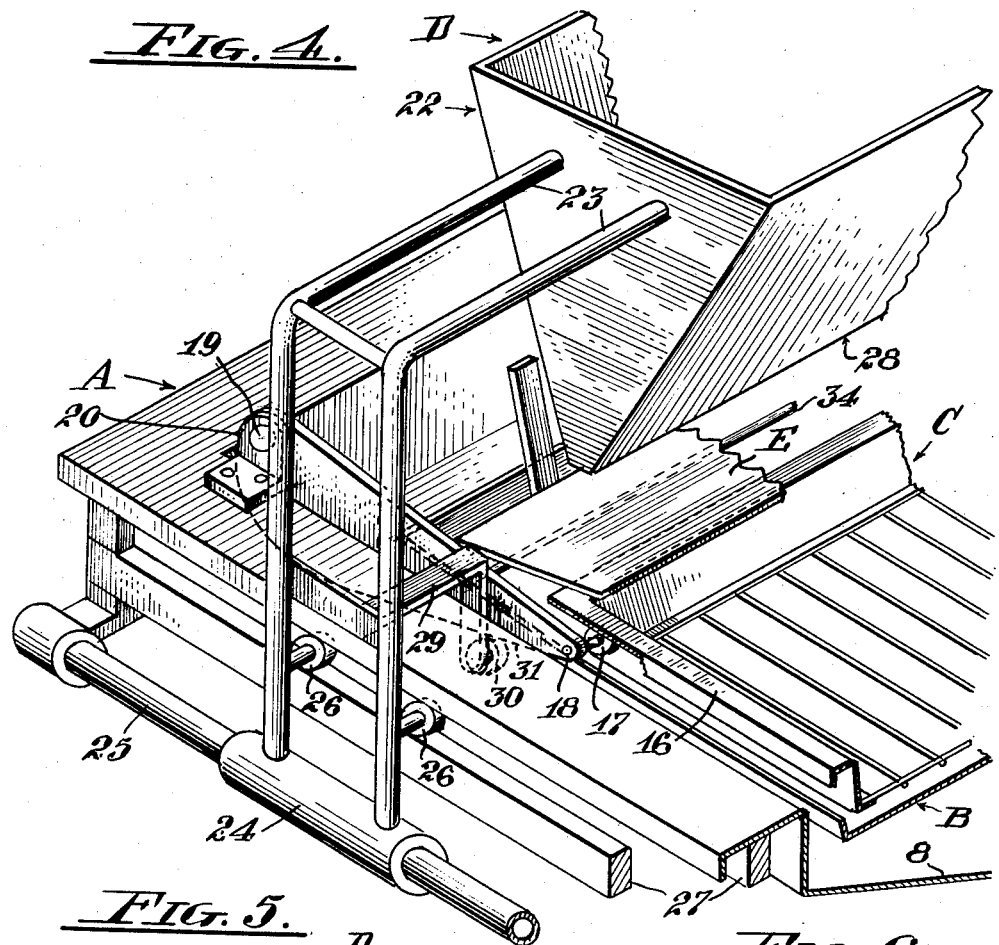
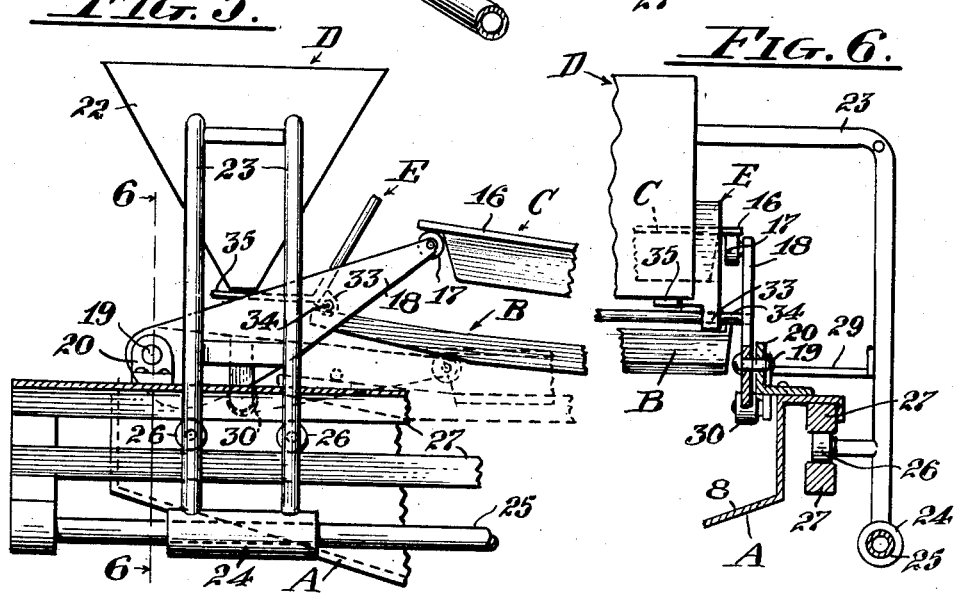

United States Patent Office 2,854,945
Patented Oct. 7, 1958

2,854,945

MACHINE FOR GLAZING DOUGHNUTS AND THE LIKE

Virgil E. Ackles, Los Angeles, Calif.

Application April 3, 1956, Serial No. 575,785

7 Claims. (Cl. 118—16)

This invention relates to a machine for applying glaze to doughnuts and the like and particularly pertains to glazing machines of the type embodying a latticed tray normally extended horizontally and adapted to support a layer of doughnuts or the like and including a glaze applicator movable horizontally over the tray and adapted to deliver a film of the glaze onto the upper surface of doughnuts and the like carried on the tray.

The primary object of the invention is to provide a construction and arrangement in the machine whereby glazing of the under side of the doughnuts on the tray may be effected substantially co-incident with the application of the glaze to the upper side thereof thereby glazing both sides of the doughnuts in one operation.

Another object is to provide a means for glazing the under sides of the doughnuts on the tray comprising a glaze containing pan positioned beneath the tray in such fashion that the underside of doughnuts on the latter will be contacted by the glaze contained in the pan, and wherein means are provided for automatically tilting the pan away from the tray and from the doughnuts therein so as to prevent excessive saturation of the undersides of the doughnuts with the glaze.

A further object is to provide a construction whereby tilting of the glaze containing pan is controlled by movement of the glaze applicator.

Another object is to provide a means controlled by movement of the glaze applicator for preventing glaze being discharged therefrom from being deposited onto an end rail or margin of the tray over which the applicator is passed.

With the foregoing objects in view together with such other objects and advantages as may subsequently appear, the invention resides in the parts and in the combination, construction and arrangement of parts hereinafter described and claimed, and as illustrated by way of example in the accompanying drawings in which:

Fig. 1 is a plan view of the machine with parts removed;

Fig. 2 is a longitudinal section taken on the line 2—2 of Fig. 1 with parts shown in elevation and showing the doughnut supporting tray and glazing pan disposed in their initial horizontal position;

Fig. 3 is a view of the machine partly in longitudinal section and partly in elevation showing the tray and pan in their actuated tilted positions;

Fig. 4 is an isometric schematic view of a fragmentary end portion of the machine included within the broken rectangle 4 in Fig. 3, depicting the tray and pan in their horizontal position and with the glaze applicator in its nearly retracted position;

Fig. 5 is an enlarged view in elevation of the structure shown in the rectangle 4 of Fig. 3 showing the pan and tray in a tilted position in full lines and as disposed in their horizontal positions in dotted lines; and Fig. 6 is a view in section and elevation taken on the line 6—6 of Fig. 5.

Referring to the drawings more specifically A indicates generally a rectangular horizontally extending basin having a downwardly sloping bottom wall 8 leading to a discharge opening 9 whereby liquid glazing or icing material delivered into the basin A may be discharged into the reservoir of a pumping apparatus in a manner common to machines of this character.

In carrying out the invention a normally horizontally shallow glazing pan B is pivotally supported intermediate its ends in the basin A, the pan being fitted on the opposite sides thereof with downwardly projecting saddles 10 seated astride a supporting bar 11 extending across the basin A and carried on the sides thereof.

The pan B is designed to be initially extended horizontally, but is sufficiently off-balance that the inner end portion thereof will normally tend to swing downwardly to dispose the pan in an inclined position as indicated in Fig. 3, the inner end of the pan being fitted with legs 12 adapted to abut the bottom wall 8 to limit tilting of the pan to a slight inclination and such that liquid glaze delivered to the pan will then tend to flow toward the inner end thereof.

Pivotally supported at the inner end of the basin A is a wire latticed tray C which is designed to overlie and extend into the pan B with its outer end contiguous the outer end portion of the bottom wall of the pan B so as to exert a downward thrust on the outer end portion of the latter and thereby hold it against upward movement through instrumentalities to be later described.

The pivotal mounting of the tray C embodies upstanding plates 13 fixed on the inner ends of the side portions of the tray and projecting upwardly therefrom, which plates are secured by pivots 14 to brackets 15 carried on the basin A.

Downward movement of the outer end portion of the tray C is limited so as to normally dispose the tray C in horizontal parallel relation to the then horizontally extending pan B; the tray C being formed with outwardly projecting marginal flanges 16 the outer end portions of which seat on the rollers 17 carried on the outer end of vertically swinging rocker arms 18 pivoted at 19 on the upper ends of brackets 20 mounted on the outer end portion of the basin A. The arms 18 normally extend substantially horizontally with their lower edges resting on stops 21 which serve to limit downward movement of the arms 18 as well as downward movement of the outer end portion of the tray C. The arms 18 are designed to be swung upwardly a short distance to thereby elevate the outer end portion of the tray C to relieve the load thereof on the pan B so that the latter will then gravitationally swing to its inclined position, as will presently be described.

Extending transversely across and above the basin A is a glaze applicator D which is mounted for movement longitudinally of the basin A in a manner common to machines of this character; the applicator D embodying a hopper 22 supported at one end thereof on a pair of brackets 23 carried on a sleeve 24 slidably mounted on a horizontally extending guide rod 25 mounted on and extending longitudinally of one side of the basin A. The brackets 23 are fitted with rollers 26 which extend between vertically spaced horizontal tracks 27 carried on the basin A which tracks and roller serve to hold the sleeve 24 against turning on the guide rod 25 and thus act to retain the applicator D in its horizontally extending position. Liquid glaze is pumped to the applicator D in a conventional manner (not shown) and is delivered from the applicator through a discharge slot 28 extending along the lower end of the hopper 22 under manual control by mechanism and in the manner common to glaze applicators (not shown).

The applicator D is movable longitudinally of the pan B and tray C when in their horizontally disposed position, being movable over the outer end portion of the tray C. Mounted on the brackets 23 is an inwardly and downwardly extending bracket 29 fitted with a roller 30 adapted to be moved in and out of engagement with the lower margin 31 of the adjacent arm 18, which margin 31 is inclined relative to the horizontal downwardly from the outer free end of the arm 18 whereby advance of the roller 30 lengthwise of the arm 18 will effect rocking movement thereof.

As a means for protecting the inner end rail of the tray C from being coated with glaze dripping from the glazing applicator D as the latter is advanced thereover, a guard plate E is provided which is adapted to overlie the outer end portion of the tray C when the latter is in its lowermost position as particularly shown in Figs. 2 and 4, the plate E being pivotally mounted at its ends adjacent a longitudinal margin thereof by sleeves 33 thereon pivoted on a cross bar 34 mounted on and connecting the arms 18. The panel E is provided on its pivoted margin with upwardly extending angularly disposed projections 35 lying in the path of travel of the lower end portion of the applicator D on movement thereof to its retracted position such as to then effect upward tilting of the plate E to an inclined position out of overlying relation to the outer end portion of the tray C so as to then permit upward movement of the latter past the plate E.

In the operation of the invention the pan B and tray C are disposed in their parallel horizontal position as shown in Fig. 2 with the guard plate E overlying the outer end of the tray C and with the applicator D overlying the plate E as indicated by the dotted lines *a* in Fig. 2. The pan B will then be maintained in its horizontal position by the load imposed on its outer end by the weight of the outer portion of the tray C bearing on the outer ends of the arms 18 so that the connecting cross bar 34 will be caused to rest on the adjacent portion of the pan B. The tray C is then loaded with a layer of doughnuts to be glazed whereupon the applicator D is moved from the position indicated at *a* to the opposite or inner end of the tray C as indicated by the dotted lines *b* in Fig. 2 and then returned during which travel the liquid glazing or icing material is delivered continuously from the applicator onto the upper surface of the doughnuts carried in the tray C. A portion of the glaze is delivered between the doughnuts to the pan B and accumulates therein during the back and forth movement of the applicator such that the lower faces of the doughnuts are submerged in the body of glaze then carried in the pan B.

On return travel of the applicator D it is carried past the position indicated in dotted lines *a* in Fig. 2 to the full line position shown in Fig. 4 whereby the roller 30 is brought into engagement with the lower edge of the adjacent arm 18 so as to swing the latter upwardly and thereby slightly elevate the cross bar 34 and the outer end portion of the tray C thus relieving the pan B of the load thereof so that the pan will gravitate to its inclined position shown in Fig. 3. The tray C will then be elevated relative to the pan B so that drainage of the doughnuts will be effected, the doughnuts then being disposed clear of the surface of the glaze contained in the pan B a portion of which glaze will be discharged into the basin A from the lower end of the pan B. Rearward movement of the applicator as just described past the position indicated by the dotted lines *a* acts to elevate the free edge of the guard plate E as before described thereby freeing the forward end of the tray C so that the latter may be swung upwardly and over as indicated by the dotted lines *e* in Fig. 3 to deposit the doughnuts contained therein onto an open wire pallet (not shown) previously applied to extend over the tray C in the usual manner.

After this is done the emptied tray C is swung back to its horizontal position whereby it engages and depresses the arms 18 so that the cross bar 34 on the latter will depress the outer end of the pan B and move the latter to its horizontal position thus conditioning the machine for another operation.

While a specific embodiment of the invention has been shown and described, the invention is not limited to the exact details of construction set forth, and the invention embraces such changes, modifications and equivalents of the parts and their formation and arrangement as come within the purview of the appended claims.

I claim:

1. In a machine for glazing doughnuts and the like, a glaze holding pan pivotally supported intermediate its ends for movement between a horizontal and an inclined position, and normally gravitating to such inclined position, a doughnut supporting latticed tray pivotally supported at one end thereof for vertical swinging movement to and from a horizontal position closely overlying the bottom of said pan, means for limiting downward movement of said tray, vertically movable arms engageable by the outer end portion of said tray overlying and acting on the outer end portion of said pan to depress same, and means for limiting swinging movement of said pan to its inclined position.

2. The structure called for in claim 1 in combination with a glaze applicator mounted for guided rectilineal horizontal movement above and along the length of the pan and tray adapted to deliver a film of liquid glaze to said tray and pan.

3. The structure called for in claim 1 in combination with a glaze applicator mounted for guided rectilineal horizontal movement above and along the length of the pan and tray adapted to deliver a film of liquid glaze to said tray and pan, and means operable on movement of said applicator to its retracted position to elevate the outer end of said tray and free said pan for movement to its inclined position.

4. In a machine for glazing doughnuts and the like, a glaze holding pan pivotally supported intermediate its ends for movement between a horizontal and an inclined position, and normally gravitating to such inclined position, a doughnut supporting latticed tray pivotally supported at one end thereof for vertical swinging movement to and from a horizontal position closely overlying the bottom of said pan, means for limiting downward movement of said tray, a glaze applicator mounted for guided rectilineal horizontal movement above and along the length of the pan and tray adapted to deliver a film of liquid glaze to said tray and pan, a vertically swinging arm having an outer end positioned for seating engagement thereon of the outer end portion of said tray, means on said arm engageable with the outer end portion of said pan to depress same, and means on said applicator engageable with said arm on movement of the applicator to its outermost position to elevate said arm and the outer end portion of said tray to thereby free said pan for gravitational movement to its inclined position.

5. In a machine for glazing doughnuts and the like, the combination of a basin, a glaze holding pan pivotally supported intermediate its ends in said basin for tilting movement between a horizontal and an inclined position and normally gravitating to such inclined position, means for limiting the tilting movement of said pan, a doughnut supporting latticed tray pivotally supported at one end thereof on said basin adjacent the downwardly tilting end of said pan, said tray being swingable vertically to and from a horizontal position overlying the bottom of said pan and being arranged when in its horizontal position to immerse the lower sides of doughnuts thereon in the body of glaze held in said pan, means limiting downward movement of the free end of said tray, vertically swinging arms actuated by said tray engageable with the adjacent end portion of said pan to dispose the pan in a horizontal position, a glaze applicator mounted for guided rectilineal movement above and along the length of said tray, said applicator being adapted to deliver glaze to the upper surfaces of doughnuts in said tray and to said pan, and means controlled by retractive movement of said applicator for elevating the free end of said tray and whereby said pan will be caused to gravitate to its tilted position, said pan being adapted when in its tilted position to discharge a portion of its glaze content into said basin.

6. In a machine for glazing doughnuts, a basin, a glaze holding pan pivotally supported intermediate its ends in said basin for tilting movement from a horizontal position to an inclined position, a pair of vertically swinging arms carried by said basin, a cross bar carried by said arms adapted to be seated and bear on one end portion of said pan to dispose the pan in its horizontal position, a doughnut receiving tray pivotally carried at one end thereof on said basin to swing vertically in and out of said pan and having its free end adapted to seat on the outer ends of said arms to bear thereon, a glaze applicator mounted for rectilineal movement longitudinally of said basin above said tray and pan, and means on said applicator for elevating said arms and cross bar to elevate the free end of said tray and thereby free said pan for tilting movement to its inclined position.

7. The structure called for in claim 6 together with a guard plate pivoted on said cross bar arranged to normally overlie and seat on the outer end of said tray, and means on said plate engageable by said applicator on retraction thereof to rock said plate free of said tray.

References Cited in the file of this patent

UNITED STATES PATENTS

| | | |
|---|---|---|
| 719,896 | Spang | Feb. 3, 1903 |
| 879,585 | Remmers | Feb. 18, 1903 |
| 2,045,272 | Hornkohl | June 23, 1936 |
| 2,380,806 | Tunley | July 31, 1945 |
| 2,417,614 | Ratcliff | Mar. 18, 1947 |
| 2,472,454 | Ackles | June 7, 1949 |
| 2,525,306 | Lunsford | Oct. 10, 1950 |